US007111698B2

(12) United States Patent
Tajima et al.

(10) Patent No.: US 7,111,698 B2
(45) Date of Patent: Sep. 26, 2006

(54) HYBRID VEHICLE CONTROLLER

(75) Inventors: Yoichi Tajima, Anjo (JP); Yoshitaka Murase, Anjo (JP); Atsushi Kayukawa, Anjo (JP); Yukinori Nakamori, Anjo (JP); Yasuhiko Kobayashi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 315 days.

(21) Appl. No.: 10/498,125

(22) PCT Filed: Aug. 8, 2003

(86) PCT No.: PCT/JP03/10107

§ 371 (c)(1),
(2), (4) Date: Jun. 9, 2004

(87) PCT Pub. No.: WO2004/014686

PCT Pub. Date: Feb. 19, 2004

(65) Prior Publication Data

US 2005/0011689 A1    Jan. 20, 2005

(30) Foreign Application Priority Data

Aug. 9, 2002  (JP) .............................. 2002-234007

(51) Int. Cl.
*B60K 6/06* (2006.01)

(52) U.S. Cl. .................. 180/65.2; 180/65.5; 180/65.6; 180/65.8; 180/65.1; 180/170

(58) Field of Classification Search ............... 180/65.2, 180/170, 65.5, 65.3, 65.6, 65.8, 65.1; 903/947
See application file for complete search history.

(56) References Cited

U.S. PATENT DOCUMENTS

| 5,957,992 | A  | * | 9/1999  | Kiyono ........................ 701/93 |
| 6,315,068 | B1 | * | 11/2001 | Hoshiya et al. ............. 180/65.2 |
| 6,335,573 | B1 | * | 1/2002  | Eguchi et al. ............. 290/40 C |
| 6,478,101 | B1 | * | 11/2002 | Taniguchi et al. ......... 180/65.2 |
| 6,687,580 | B1 | * | 2/2004  | Suzuki et al. ................. 701/22 |
| 6,805,211 | B1 | * | 10/2004 | Fujikawa ................... 180/65.2 |
| 6,953,415 | B1 | * | 10/2005 | Kadota .......................... 477/5 |
| 6,955,144 | B1 | * | 10/2005 | Sakai et al. .............. 123/90.11 |
| 6,988,974 | B1 | * | 1/2006  | Kobayashi et al. ............ 477/3 |
| 7,040,433 | B1 | * | 5/2006  | Yamamoto et al. ........ 180/65.2 |

FOREIGN PATENT DOCUMENTS

| EP | 1 034 957 A2  | 9/2000  |
| EP | 1 036 695 A2  | 9/2000  |
| EP | 1 074 417 A2  | 2/2001  |
| JP | A 2000-287304 | 10/2000 |
| JP | A 2001-163071 | 6/2001  |

* cited by examiner

*Primary Examiner*—J. Allen Shriver
*Assistant Examiner*—Cynthia F. Collado
(74) *Attorney, Agent, or Firm*—Oliff & Berridge, PLC

(57) ABSTRACT

The controller includes motor control means for controlling the drive RPM of a motor generator to reach a specified RPM less than the idle RPM when the braking condition of a foot brake is detected by a brake-operating-state detecting means while a motor generator is being rotated at an idle RPM or more. This reduces uncomfortable shock which tends to occur because of a change in the rotation of the motor during braking as much as possible to improve drive feeling.

20 Claims, 9 Drawing Sheets

HYBRID VEHICLE CONTROLLER

This application is the U.S. National Stage of PCT/JP2003/010107 filed Aug. 8, 2003 which claims priority from JP2002-234007 filed Aug. 9, 2002, the disclosures of which are incorporated herein in their entireties by reference thereto.

BACKGROUND OF THE INVENTION

1. Field of the Invention

The invention relates to a hybrid vehicle controller having an idling stop function and, more particularly, it relates to a control device for a hybrid vehicle capable of avoiding a shock which tends to occur between braking and starting during motor single running.

2. Description of Related Art

For hybrid cars including an internal combustion engine (hereinafter, referred to as an engine) and a motor generator (hereinafter, referred to as a motor) as the primary drive, particularly, hybrid cars having a so-called idling stop function of stopping an engine and a motor every time an accelerator pedal is released and a brake pedal (service brake (foot brake)) is depressed to stop the car, driving units have been proposed that operate only the motor at startup after the stop and ignite, or start, the engine, which is rotated by the motor at the point in time when the engine rotation reaches a certain speed as described, for example, in JP-A-2001-163071.

With the hybrid-car driving unit, when the brake pedal is released during stopping in which the idling stop function is activated, the motor which has been stopped until then starts to rotate at idle speed to start so-called creeping and when the brake pedal is depressed again, the motor stops. Accordingly, low-speed running can be performed by depressing (ON) or releasing (OFF) the brake pedal during traffic congestion or parking. "Creep" generally means that automatic cars including a torque converter move slowly at an engine torque though the torque converter when a brake pedal is released without an acceleration pedal depressed and with the gear switched to a drive (D) range or a reverse (R) range. "Creep" in this description, however, means that cars move slowly not at a torque of the internal combustion engine but with torque through a torque converter when a motor generator operates.

With the above-described hybrid-car driving units, when the motor generator repeats the stop and the rotation by repeating the depression and release of the brake pedal (ON and OFF of the brake), uncomfortable shock occurs and is applied to a driver each time.

SUMMARY OF THE INVENTION

Accordingly, it is an object of the invention to provide a control device for a hybridvehicle in which the above problems are solved by properly controlling the motor speed when cars are braked during creeping by rotating only a motor after stopping with an idling stop function, thereby avoiding the uncomfortable shock, which could easily occur, as soon as possible.

A control device for a hybrid vehicle includes a motor having a rotor and a starter (i.e., torque converter) capable of transmitting the driving forces of an engine and the motor to downstream power transmission components and also of rotating the rotor when the driving wheelsare braked. The control device for a hybridvehicle includes brake-operating-state detecting means for detecting the operating state of a brake for braking or releasing the driving wheel; and motor control means capable of controlling the drive rotational speed of the motor to a predetermined rotational speed less than the idling rotational speed when the brake-operating-state detecting means detects the braking state while the motor is being rotated at an idling rotational speed or more with the engine ignition off. Throughout this application "rotational speed" means a measure of rotation, for example, "revolutions per minute (RPM)".

In the invention, "motor" means not only a so-called motor that converts electrical energy to revolutions in a narrow sense but also a so-called generator that converts revolutions to electrical energy. "Engine" means an internal combustion engine that burns fuel to convert energy to revolutions and includes a gasoline engine, a diesel engine or the like.

Accordingly, when the braking state is detected while the motor is being rotated at an idling rotational speed or more, the motor control means controls the motor rotational speed to a predetermined rotational speed less than the idling rotational speed, eliminating a shock at the time of switching from static friction of the motor to dynamic friction which tends to generate every time the brake is released or applied during creeping, thus improving drive feeling. Driving at a rotational speed lower than the idling rotational speed at the time of braking leads to efficient reduction in power consumption.

By setting the predetermined rotational speed depending on the control input of the brake an optimum motor rotational speed corresponding to the braking input control can be obtained.

Further, because the rotor is directly connected to an output shaft of the engine, the engine output shaft can be rotated stably by the rotation of the motor to start the engine, thereby reducing, as much as possible, the vibrations of the engine and its mount which tend to generate at the time of engine startup.

The engine resonance rotational speed means a rotational speed in the range of large vibration at the point in time when the natural frequency of the engine has become equal to that of the motor. The resonance rotational speed differs depending on the kind (type) of the engine, approximately from 400 to 500 rotational speed.

Because the predetermined rotational speed is less than the idling rotational speed and larger than the engine resonance rotational speed, uncomfortable shock that tends to easily occur at the time of start and stop during creep running can be reduced as much as possible by controlling the motor rotational speed not to pass through the range of the engine resonance rotational speed every time the motor rotational speed decreases, thus improving drive feeling.

The motor control means stops the motor rotating at the predetermined rotational speed at the point in time when a predetermined time has elapsed from the start of the braking. Because the motor rotating at a predetermined rotational speed is stopped at the point in time when the time from the start of braking has elapsed, i.e., exceeds a predetermined time, it can be determined from the braking elapsed time that a driver desires to stop the car not intermittently but completely preventing creeping, and the motor can be stopped on the basis of the determination. Thus, unnecessary rotation of the motor can be prevented and power consumption can be reduced.

The control device includes control-input determination means for determining the braking control input of the brake. When the braking state of the brake is detected by a brake-operating-state detecting means, and the braking control input determined by the control-input determination means is less than a predetermined value, the motor control means does not perform switching to the predetermined rotational speed to maintain the idling rotational speed.

Accordingly, when the brake control input determined by the control-input determination means is less than a predetermined value at the time of detection of the braking state by the brake-operating-state detecting means, the motor control means can control the motor not to switch to the predetermined rotational speed to maintain the idling rotational speed. Therefore, for example, when the braking control input is less than 50 percent, the idling rotational speed can be maintained while regarding it as a state in which creeping by the motor is desired; on the other hand, when the depression amount exceeds 50 percent, the rotational speed can be switched to the predetermined rotational speed while regarding it as a state in which a temporary stop is desired. In this way, accurate motor drive control can be performed while determining the driver's intention depending on the difference in brake depression amount.

BRIEF DESCRIPTION OF THE DRAWINGS

The invention will be described with reference to the drawings, in which.

DETAILED DESCRIPTION OF PREFERRED EMBODIMENTS

A first example will now be described.

Figure 2:
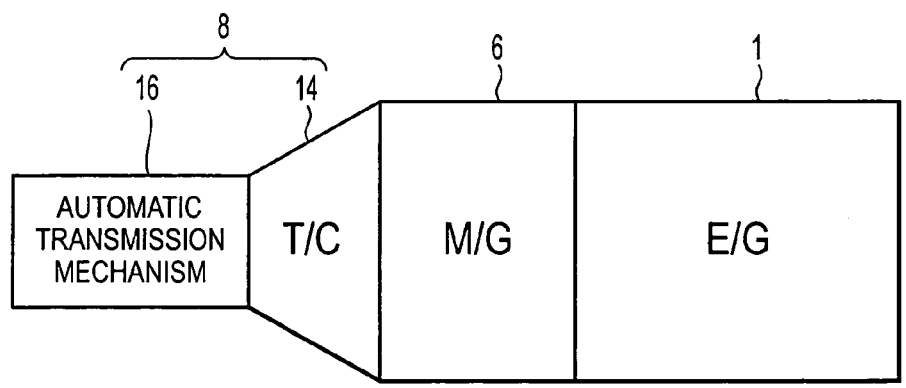
FIG. 2 is a schematic block diagram of a hybrid-vehicle driving system that can be controlled by the control device of FIG. 1.

Referring to FIG. 2, the primary drive of the hybrid car includes an internal combustion engine (hereinafter, referred to as an engine) 1 and a motor generator (hereinafter, referred to as a motor) 6. Their driving forces are outputted to an automatic transmission 8. The automatic transmission 8 includes a torque converter (starting unit) 14 that transmits the driving forces of the engine 1 and the motor 6 to downstream power transmission components and allows rotation of a rotor 13 of the motor 6 when the driving wheels are braked and an automatic transmission mechanism (multistep transmission mechanism) 16. The automatic transmission mechanism 16 varies the inputted driving force depending on a predetermined car driving condition and outputs it to the driving wheels. The automatic transmission mechanism 16 includes a plurality of frictional engaging elements (not shown) for gear change and a hydraulic controller (not shown) for controlling the torque converter 14, which provides timely gear change by varying the engaging condition of the frictional engaging elements with a hydraulic control.

Figure 3:
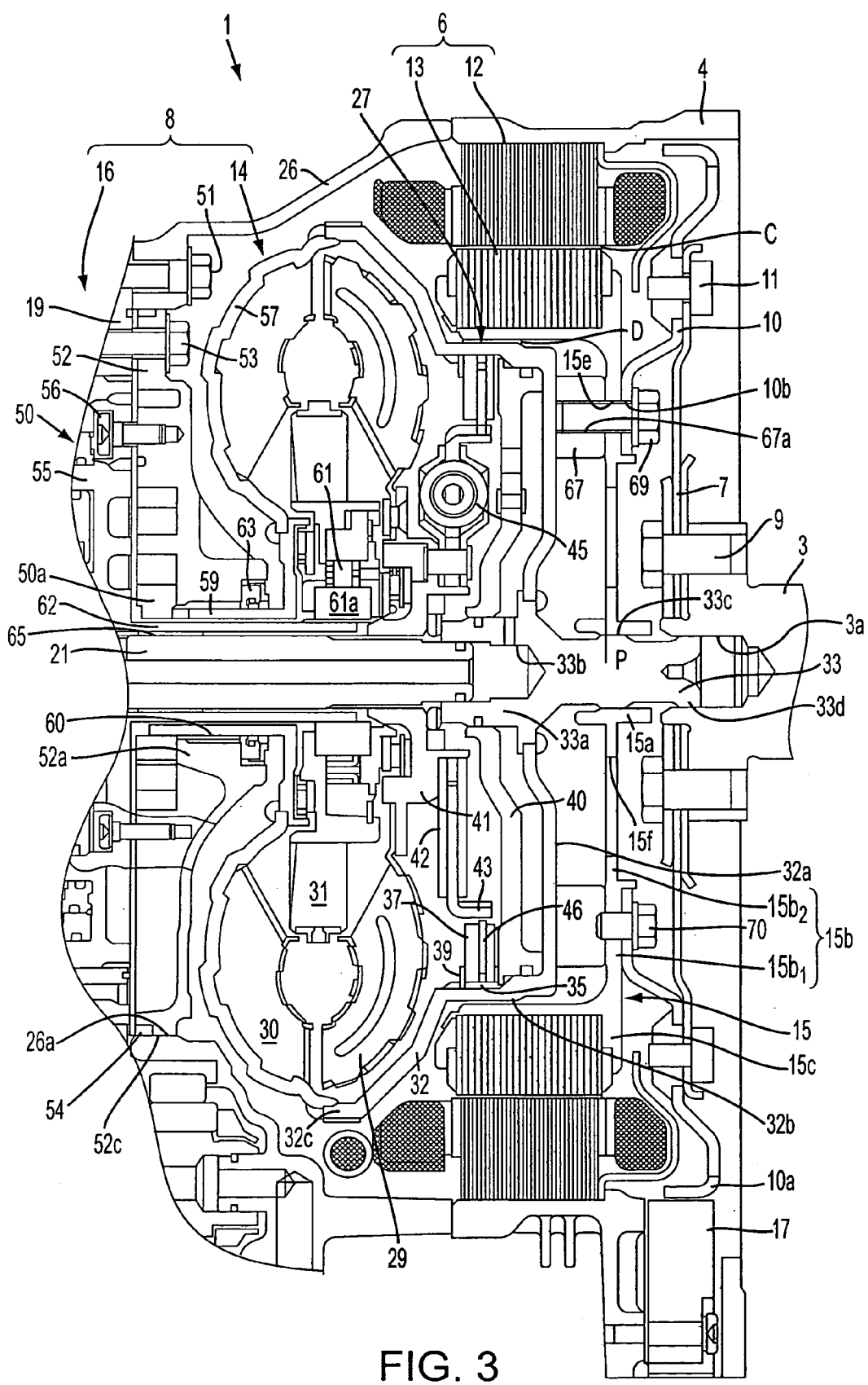
FIG. 3 is a partial sectional view of a specific example of the driving system of FIG. 2.

Referring now to FIG. 3, an example of the driving system of FIG. 2 will be described. The driving system has the motor generator (hereinafter "motor") 6 attached to the torque converter of an automatic transmission (A/T), including the engine 1 (refer to FIG. 2). The motor 6 is a brushless DC motor accommodated in a motor housing 4, and the automatic transmission 8 receives the driving forces from the engine 1 and the motor 6. The motor 6 includes a stator 12 and a rotor 13. The rotor 13 is connected directly to a crankshaft (output shaft) 3 of the engine 1, as will be described later. Therefore, the motor 6 is driven to rotate with the crankshaft 3 when the engine is running and, when the engine 1 is OFF (not running), the motor 6 rotates the engine 1 through rotating the crankshaft 3.

The crankshaft 3 extends from the engine 1 to the automatic transmission 8. A flexible drive plate 7 is fixed to the end of the crankshaft 3 with a bolt 9. A flexible input plate 10 is disposed in the position facing the drive plate 7 with the respective ends fixed and joined together with a bolt 11. The plates 7, 10 comprise a flex plate. The crankshaft 3 of the engine 1 has a later-described hole 3a in the end face thereof.

The rotor 13 of the motor 6 is formed of a large number of lamination plates in which permanent magnets are embedded and a support plate 15 for fixing or supporting the lamination plates. The support plate 15 includes a cylindrical hub 15a disposed in the center of rotation, a circular disk 15b connected to the hub 15a and arranged along the drive plate 7, and a cylindrical retaining section 15c connected to the outer periphery of the circular disk 15b. The retaining section 15c retains the lamination plates arranged in the axial direction.

A part of the input plate 10 passes by the stator 12 of the motor 6 to extend to the outer periphery. An end 10a of the plate extension is cut out in comb shape. A sensor 17 is disposed in the position of the motor housing 4 facing the plate cutout 10a. The phase of the rotor 13 of the motor 6 is detected by detecting the extension of the plate by the sensor 17. The sensor 17 is arranged at the end (adjacent to the engine) of the motor housing 4 such that it faces the outer periphery, the detecting section of which is arranged in a recess formed in the outer-periphery extension of the motor housing 4. The sensor 17 detects the accurate rotational position of the rotor 13 to control the timing of a current applied to the stator 12.

On the other hand, the automatic transmission mechanism 16 of the automatic transmission 8 is housed in a mission case and a rear case (not shown), respectively. The torque converter 14 of the automatic transmission 8 is housed in a converter housing 26. The torque converter 14 includes a lockup clutch 27, a turbine runner 29, a pump impeller 30, a stator 31, and a front cover 32. The cover 32 has a center piece 33 on the outside thereof fixed to the center of rotation.

The front cover 32 is formed of a circular-disk-shaped inner circle surface 32a arranged along the circular disk 15b of the rotor 13, a cylindrical middle section 32b connected to the outer periphery of the inner circle surface 32a along the retaining section 15c, and an outer circle surface 32c connected to the middle section 32b along the outer shape of the turbine runner 29 and fixed to the pump impeller 30. The stator 12 and the rotor 13 are arranged in the substantially axial direction on the outer periphery at the middle section 32b of the front cover 32. The rotor support plate 15 is supported in the center between the inner surface of the retaining section 15c of the rotor support plate 15 and the outer surface of the front-cover middle section 32b with a predetermined clearance D therebetween.

The lockup clutch 27 is housed in the inner circle surface of the middle section 32b of the front cover 32. A spline 35 extending in the axial direction is integrated with the inner surface of the front-cover middle section 32b. A plurality of outer friction plates 37 is in engagement with the spline 35. A snap ring 39 prevents the outer friction plates 37 from falling off. A piston plate 40 is movably arranged in an oil-tight manner between the inner surface of the middle section 32b and the outer surface of a lockup piston hub 33a integrated with the center piece 33. A hub 41 connected to the turbine runner 29 is joined with a spline to an input shaft 21 in the vicinity of the lockup piston hub 33a, to which two disks 42 are fixed. The lockup clutch 27 is small in diameter so that it can be housed inside the motor 6. The lockup clutch 27 is a multiplate clutch, which can surely transmit the diving forces of the motor 6 and the engine 1 to the input shaft 21 even when both of the motor 6 and the engine 1 are driven.

The disks 42 support a clutch hub 43. Between the disks 42 and the clutch hub 43, a damper spring 45 is interposed to absorb impact rotation. The clutch hub 43 extends toward the outer circle surface and is bent in the axial direction. A plurality of inner friction plates 46 is connected to a spline formed at the bent portion. Briefly, the outer friction plates 37 and the inner friction plates 46 form the multiplate clutch for the lockup clutch. A predetermined oil pressure is applied to or released from an oil chamber formed between the piston plate 40 and the front-cover inner circle surface 32a, so that the piston plate 40 is moved to control the pressure of the plate 40 applied to the outer friction plates 37 so that the connection, release, or slip of the friction plates 37, 46 is controlled.

An oil pump 50 is disposed between the torque converter 14 and the automatic transmission mechanism 16. The converter housing 26 and a mission case 19 are joined together with a large number of bolts 51. A pump case 52 is integrated with the mission case 19 with a large number of bolts 53. A pump cover 55 is joined to the pump case 52 with a bolt 56. The pump case 52 is positioned such that its outer peripheral surface 52c is fitted to the inner surface 26a of the converter housing 26 in oil-tight manner via an O-ring 54. A rear cover 57 welded to the front cover 32 is integrated with the outer shell of the pump impeller 30. A sleeve-like impeller hub 59 is integrated with the inner circle surface of the rear cover by welding. The impeller hub 59 is rotatably supported, with a bushing 60, on the inner peripheral surface of the cylinder 52a of the pump case 52 integrated with the cases 26, 19. The impeller hub 59 is joined to a rotor 50a of the oil pump 50 at the end. In other words, the rear of the torque converter 14 is rotatably supported to the pump case 52 integrated with the converter housing 26 via the bushing 60.

The stator 31 is connected to a one-way clutch 61. An inner race 61a of the one-way clutch 61 is spline-connected to a sleeve shaft 62. The end of the sleeve shaft 62 is fixed to the pump cover 55 with a spline. An oil seal 63 is placed between the impeller hub 59 and the pump case 52. The input shaft 21 is indirectly supported to the integrated pump case 52 and pump cover 55 via the sleeve shaft 62, with a bushing or a needle 65 interposed between the sleeve shaft 62 and the input shaft 21, in the inner circumferential surface of the oil pump 50.

The end of the input shaft 21 is fitted in a hole 33b of the center piece 33 of the torque converter 14 such that it is in contact with an O-ring. Accordingly, the center piece 33 is supported between the input shaft 21 and the crankshaft 3 such that the rear hole 33b is fitted on the input shaft 21 and the front is fitted in the hole 3a of the crankshaft 3. Briefly, the front of the torque converter 14 is supported by the crankshaft 3 through the center piece 33. The crankshaft 3 is rotatably supported to an engine body (not shown) though a bearing made of metal or the like.

The center piece 33 increases in diameter in the center of the projection thereof. The hub 15a of the rotor support plate 15 is in contact with the increased diameter portion 33c to support the support plate 15. The end of the projection of the center piece 33 also increases in diameter. The increased diameter portion 33d is in contact with the hole 3a of the crankshaft 3 to support the center piece 33. Specifically, the rotor support plate 15 is approximately flat shaped and is supported in the central position at a small-diameter portion extending in the direction of the inner circle surface of the rotor 13 such that it is not limited in inclination by the axial contact of the increased diameter portion 33c of the center piece 33 with the hub 15a in a relatively small area. The center piece 33 is also centered on the crankshaft 3 with a predetermined inclination allowed by the increased diameter portion 33d.

The front cover 32 has a set block 67 in the outer circle surface of the inner circle surface 32a. A bolt 69 is screwed in a screw hole 67a of the set block 67 through a hole 15e of the rotor support plate 15 and a hole 10b of the input plate 10, thereby integrating the front cover 32, the rotor support plate 15, and the input plate 10. The rotor support plate 15 and the input plate 10 are fixed together also with a bolt 70. The circular disk 15b of the rotor support plate 15 is large in thickness at an outer circle $15b_1$ of the portion fixed (15e) with the bolts 69, 70, is relatively small in thickness at an inner circle $15b_2$ and has a predetermined number of perforations 15f.

Figure 1:
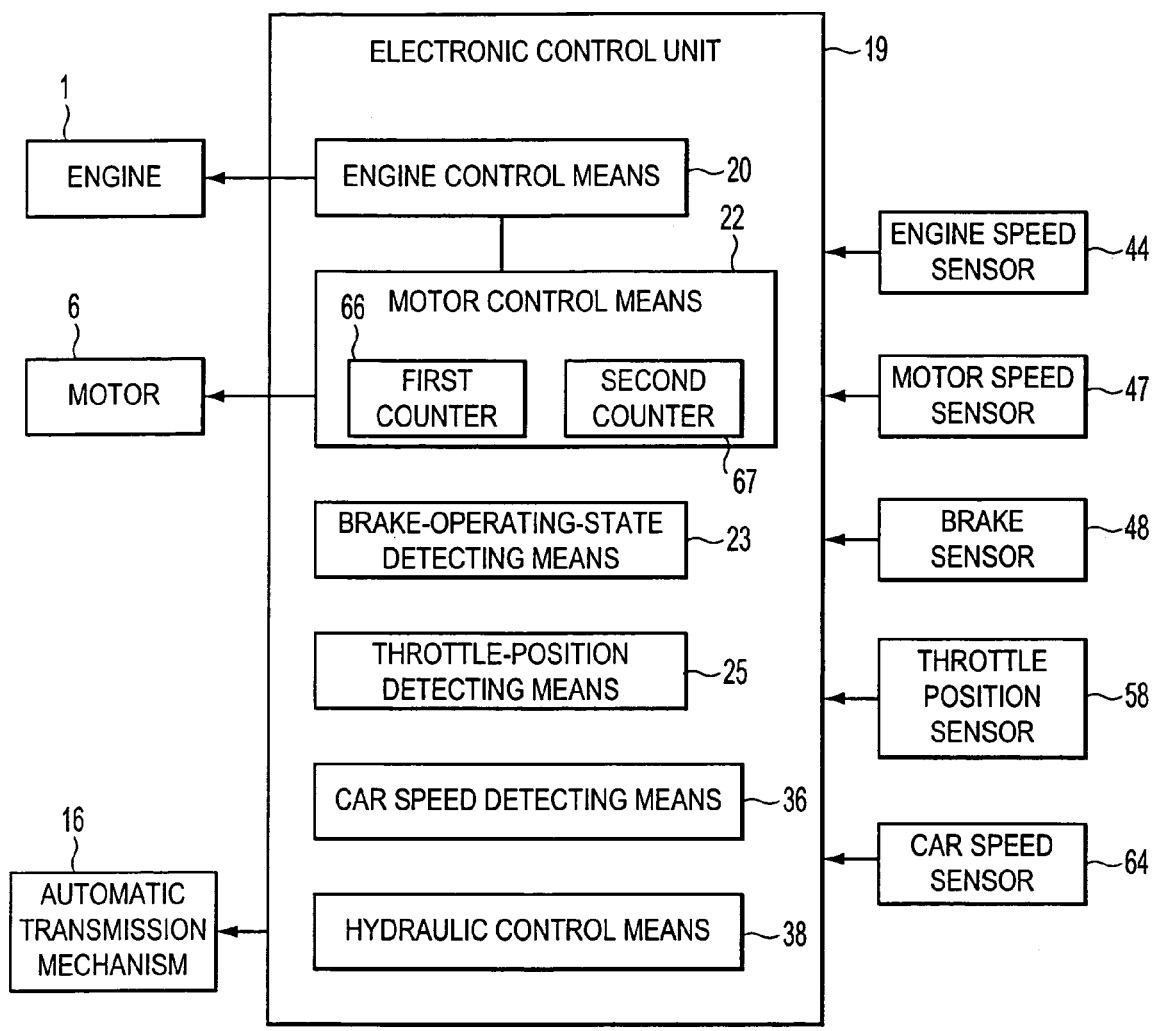
FIG. 1 is a block diagram of a control device for a hybrid vehicle according to a first example.

As shown in FIG. 1, the control device for a hybrid-vehicle includes an electronic control unit (ECU) 19. The electronic control unit 19 includes an engine control means 20, a motor control means 22, a brake-operating-state detecting means 23, a throttle-position detecting means 25, a car-speed detecting means 36, and a hydraulic control means 38.

The electronic control unit 19 further has an engine-speed sensor 44 for sensing the rotational speed of the engine 1, a motor speed sensor 47 for sensing the rotational speed of the motor 6, a brake sensor 48 for sensing the ON (depression) and OFF (release) of a brake by brake pedal operation, a throttle position sensor 58 for sensing the opening of a throttle, and a car-speed sensor 64 for sensing the travel speed of a car (car speed), connected to the input side. The electronic control unit 19 also has the engine 1, the motor generator 6, and the automatic transmission mechanism 16, connected to the output side.

The engine control means 20 performs the controls for driving the engine 1, such as stop control of the engine 1 depending on the car speed sensed by the car-speed detecting means 36 on the basis of the detection by the car-speed sensor 64 and the brake operating state sensed by the brake-operating-state detecting means 23 on the basis of the detection by the brake sensor 48, later-described determination of complete ignition of the engine 1, and ignition control of the engine 1. In the ignition control, the engine control means 20 controls the engine 1 such that the driving of the engine 1 is stopped by turning off an injection (fuel injector) at the point in time when the car-speed detecting means 36 detects car speed 0 km/h on the basis of the determination of the car-speed sensor 64 and after the running is started by the rotation of only the motor 6 and when the throttle opening exceeds a predetermined value and the engine speed exceeds a predetermined value, the injection is turned on to rotate the engine 1.

The motor control means 22 controls current supply so as to stop the rotation of the motor 6 when the running car is stopped by a braking operation, in synchronization with the stop of the engine 1 under the control of the engine control means 20 and controls the motor 6 so as to start running again with the crankshaft of the engine 1 in unfired condition when the brake pedal is released from the stop state to start the rotation of the motor 6.

The motor control means 22 controls the motor 6 such that when the braking state is sensed by the brake-operating-state detecting means 23 while the motor 6 rotates at the idling rotational speed, an idling stop signal is outputted to the engine control means 20 to maintain the ignition off state of the engine 1 and to bring the rotational speed of the motor 6 to a predetermined rotational speed N1 lower than the idling rotational speed and higher than the engine resonant rotational speed. That is, the engine resonant rotational speed is lower than the idling rotational speed. Specifically, the motor control means 22 sets a motor-generator(MG)-rotational speed instruction value to bring the motor rotational speed to the predetermined rotational speed N1 lower than the idling rotational speed and higher than the engine resonant rotational speed from 400 to 500 rotational speed so that an electric current corresponding to the instruction value is applied to the motor 6. The predetermined rotational speed N1 may be set at, for example, 600 rotational speed.

The motor control means 22 controls the motor 6 which is rotating at the predetermined rotational speed N1 to stop at the point in time when the braking by the brake pedal depression has elapsed for a predetermined time (later-described T1).

The brake-operating-state detecting means 23 senses the operating state of a foot brake (service brake) that brakes or releases driving wheels (not shown) by brake-pedal depression on the basis of the determination inputted from the brake sensor 48.

The throttle-position detecting means 25 detects the throttle opening by acceleration-pedal depression on the basis of the determination of the throttle position sensor 58. The car-speed detecting means 36 determines the car running speed on the basis of the determination inputted from the car-speed sensor 64. The hydraulic control means 38 controls the operation of a hydraulic control valve for a hydraulic servo (not shown) and so on which varies the engaging state of the plurality of friction engaging elements of the automatic transmission mechanism 16, such as a brake and a clutch.

Figure 5:
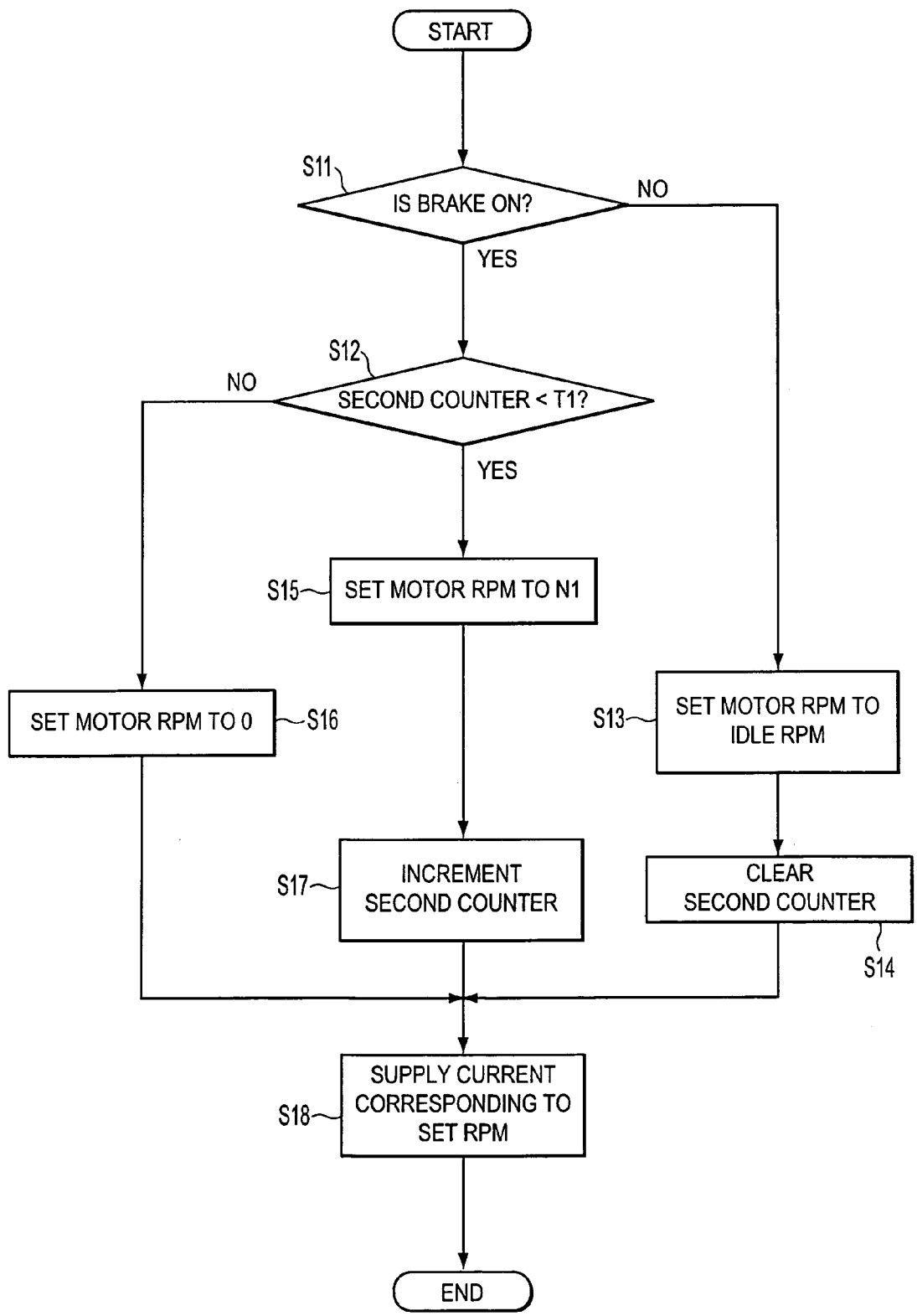
FIG. 5 is a flowchart of a subroutine for the motor drive control found as step S2 of FIG. 4.
Figure 6:
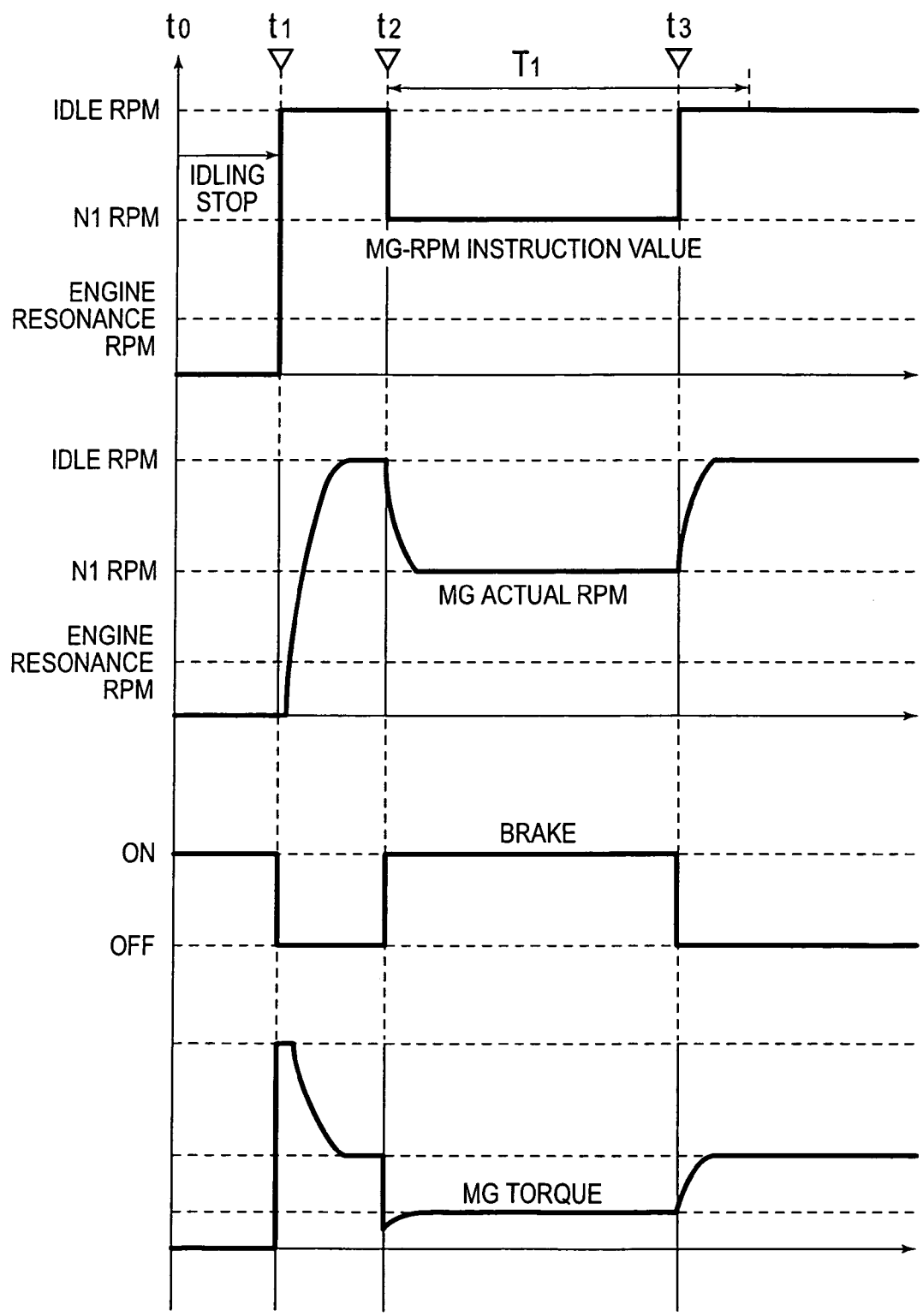
FIG. 6 is a timing chart for the operation timing of braking operation and a motor rotational speed.
Figure 7:
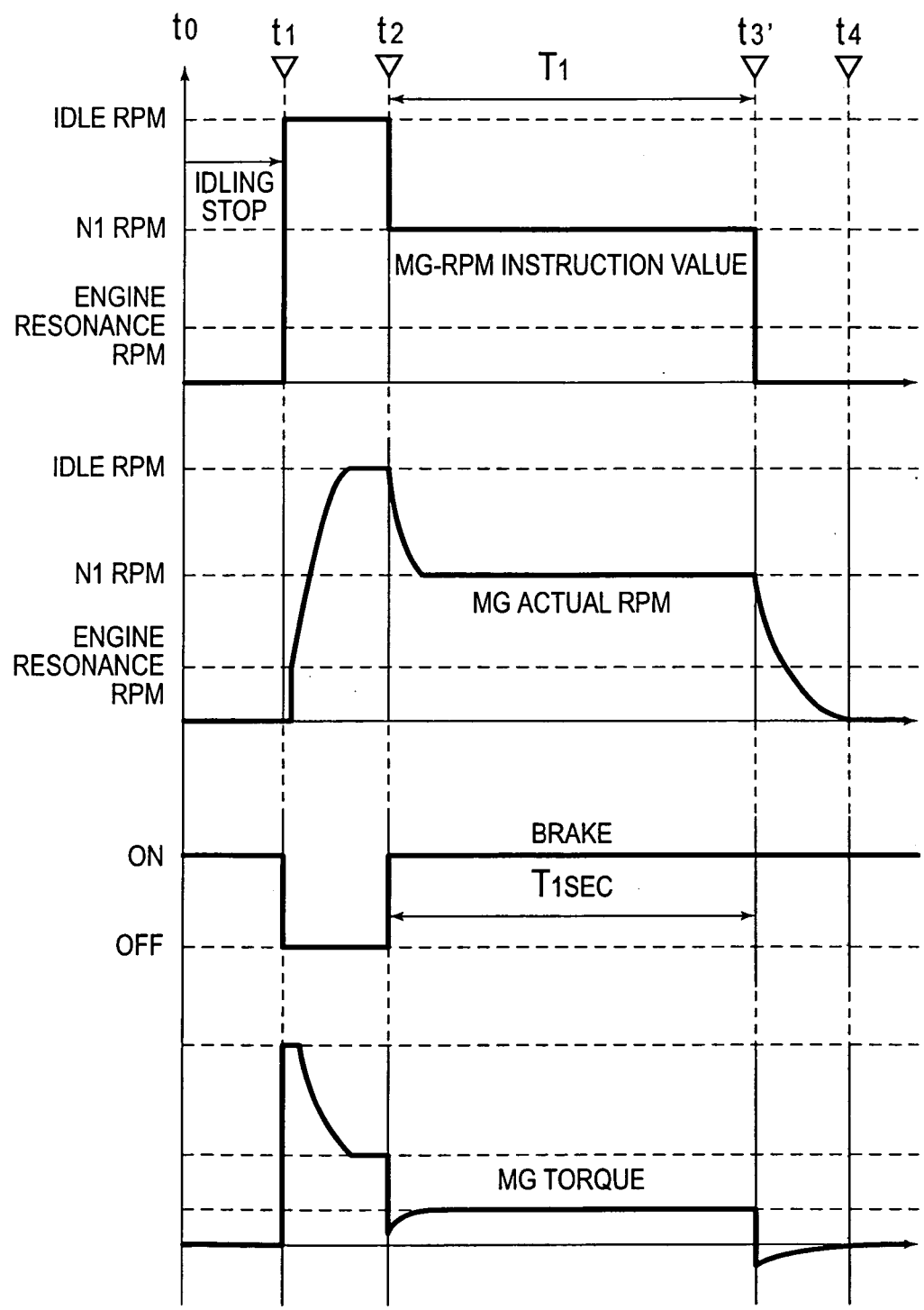
FIG. 7 is a timing chart for the operation timing of braking operation and a motor rotational speed.

Referring now to the flowcharts of FIGS. 4 and 5 and the timing charts of FIGS. 6 and 7, showing the operation timings of braking operation and motor rotational speed, the drive control by the controller of this embodiment will be described.

In a state in which a car having the controller is in a stopped state, when an ignition switch (not shown) is turned on and an acceleration pedal is depressed (at the time of low throttle opening), an electric current is applied from a battery (not shown) to the motor generator 6, and so the motor generator 6 works as motor. Specifically, the motor control means 22 of the electronic control unit 19 feeds a current through a coil of the stator 12 at a proper timing to rotate the rotor 13 forward at high efficiency and a first counter 66 starts to count the single running time of the motor 6. Thus, the rotating force is increased at a predetermined torque ratio through the torque converter 14 and transmitted to the input shaft 21.

At the startup, the injection (fuel injector) of the engine 1 does not operate and so the engine 1 is in a stopped state, so that the car starts only with the driving force of the motor 6. At that time, the support plate 15 (refer to FIG. 3) is rotated by the rotation of the motor 6, so that the crankshaft 3 is rotated through the input plate 10 and so on to move the piston of the engine 1 in ignition OFF state to and fro while repeating the compression and releasing of the air in the cylinder chamber. The motor 6 has a driving characteristic that outputs a high torque during low rotational speed. In combination with an increase in the torque ratio of the torque converter 14 with a high torque ratio due to the first speed of the automatic transmission mechanism 16, a car starts and runs smoothly at a predetermined torque.

In a state in which a car is running at a steady high speed, the motor 6 is driven at no load to run at idle such that motor output is controlled so as to offset the torque generated by a generated back electromotive force. Accordingly, the car runs by the driving force of only the engine 1. When the state of charge (SOC) of a battery (not shown) is low, the motor generator 6 is used as generator to regenerate the energy.

In a state in which a car stops at a light or for parking, the rotation of the motor 6 is stopped and also the engine 1 is stopped by the injection OFF into an idling stop state without the conventional engine idling.

Figure 4:
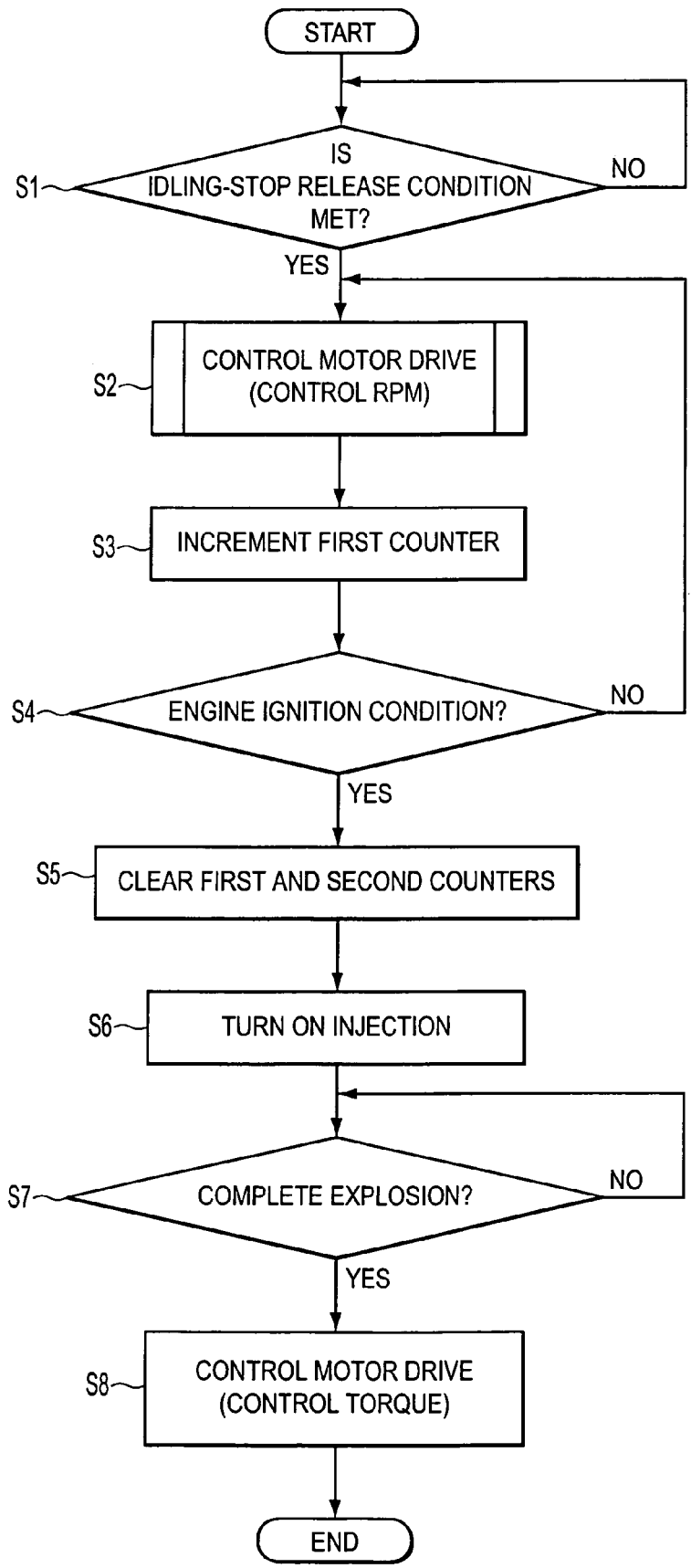
FIG. 4 is a flowchart of a main routine for the drive control according to the first example.

When the car starts from the stopped state, various conditions are determined in step S1 of FIG. 4. The conditions are the ON/OFF state of the throttle, the ON/OFF state of the ignition key (output/non-output of a start (STT) signal), whether the present car speed exceeds a predetermined value 1 (the speed at which the car starts to run: 0 km/h), the ON/OFF state of an idling-stop release signal, whether the brake is applied, and the like. Step S1 is repeatedly performed until the conditions reach predetermined values and, when the conditions are satisfied, the process shifts to step S2.

In step S2, a motor drive control (rotational speed control) is performed for setting the rotational speed of the motor 6, which will be described later. Then, in step S3, the first counter 66 that counts the single running time of the motor 6 is incremented. In step S4, engine ignition conditions are determined. The conditions include the ON/OFF state of the throttle, the ON/OFF state of the STT signal, the ON/OFF state of the idling-stop release signal, and whether the count value of the first counter 66 exceeds a predetermined value 2 (the single running time of the motor 6: for example, 10 sec). The process from step S2 is repeated until the conditions reach predetermined values and, when the conditions are satisfied, the process shifts to step S5.

In step S5, the first counter 66 and a second counter 68, that has counted the brake-pedal depression time, are cleared. Even when the car speed immediately after starting is relatively low, when the acceleration pedal is depressed to open the throttle to a predetermined opening or more to accelerate or to go up a hill, in step S6, the injection is turned on by the engine control means 20 to ignite the engine 1 with an ignition plug with the motor 6 acting as a starter motor Upon ignition of the engine 1, in step S7, the deviation between the engine rotational speed determined by the engine-speed sensor 44 and the motor-rotational speed instruction value set by the motor control means 22 is determined to determine whether the engine 1 has started completely (i.e., the engine is firing properly). As a consequence, when it is determined that the engine 1 has completely started and is properly running, on the basis of the occurrence of the deviation, the motor control means 22 starts the torque control of the motor 6 in step S8.

When the engine 1 starts to operate by the complete firing, the rotating force of the crankshaft 3 is transmitted to the support plate 15 through the drive plate 7 and so on, to which the driving forces of the engine 1 and the motor generator 6, working as motor, are added, which is transmitted to the torque converter 14, allowing the car to run with high driving force. A hydraulic controller (not shown) is operated under the control of the hydraulic control means 38 to upshift the automatic transmission mechanism 16, thereby allowing a desired rotational speed rotation to be transmitted to the driving wheels.

Referring to FIG. 5, the subroutine of the motor drive control (rotational speed control) shown in step S2 will be described. In step S1, when the throttle-position detecting means 25 determines that there is no acceleration pedal depression (throttle opening is zero percent) on the basis of the detection by the throttle position sensor 58 or the brake-operating-state detecting means 23 detects the ON state of the foot brake (time $t_0$ in FIG. 6), the engine control means 20 and the motor control means 22 determine that so-called creeping is required by a driver.

Specifically, in step S11, it is determined whether the brake pedal has been depressed (ON), wherein when it is determined that the brake is not turned on (not depressed), or the ON-mode foot brake has been turned off (break released) (time $t_1$ in FIG. 6), in step S13, the motor control means 22 sets an MG-rotational speed instruction value for bringing the motor rotational speed to an idling rotational speed. Furthermore, the motor control means 22 controls the motor so that a current corresponding to the instruction value is fed to the motor 6 and thereafter, in step S14, clears the count by the second counter 68.

When it is determined in step S11 that the brake that had been turned off has been turned on (time $t_2$ of FIG. 6), it is determined in step S12 whether the count value of the brake-pedal depression time by the second counter 68 is less than the predetermined time T1 (for example, 3 sec), wherein when it is determined to be still less than the predetermined time T1 (the interval between time $t_2$ and $t_3$ of FIG. 6), the motor control means 22 controls the motor 6 to set the motor rotational speed to the predetermined rational speed N1 in step S15, increments the second counter 68 in step S17, and to supply a current corresponding to the predetermined rational speed N1 in step S18. In this way, the motor rotational speed is reduced to the predetermined rational speed N1 during the interval between the times $t_2$ and $t_3$ that requires no higher rotational speed than required to turn on the brake, so that power consumption can be saved. Thereafter, for example, when the foot brake is released before the elapse of the predetermined time T1, the motor control means 22 performs the processes of steps S11, S13, S14, and S18 to increase the rotational speed of the motor 6 that has rotated at the predetermined rotational speed N1 to an idling rotational speed.

When it is determined in step S12, that the count value of the second counter 68 has reached more than the predetermined time T1 (time $t_3'$ of FIG. 7) (No), the motor control means 22 sets the rotational speed of the motor 6 to 0 in step S16 and controls the motor 6 to operate in accordance with the setting (or stop the rotation) in step S18. Thus, current supply to the motor 6 is stopped and so the actual motor rotational speed (MG actual rotational speed) gradually decreases from the time $t_3'$ of FIG. 7 to the actual stop time $t_4$.

Figure 8:
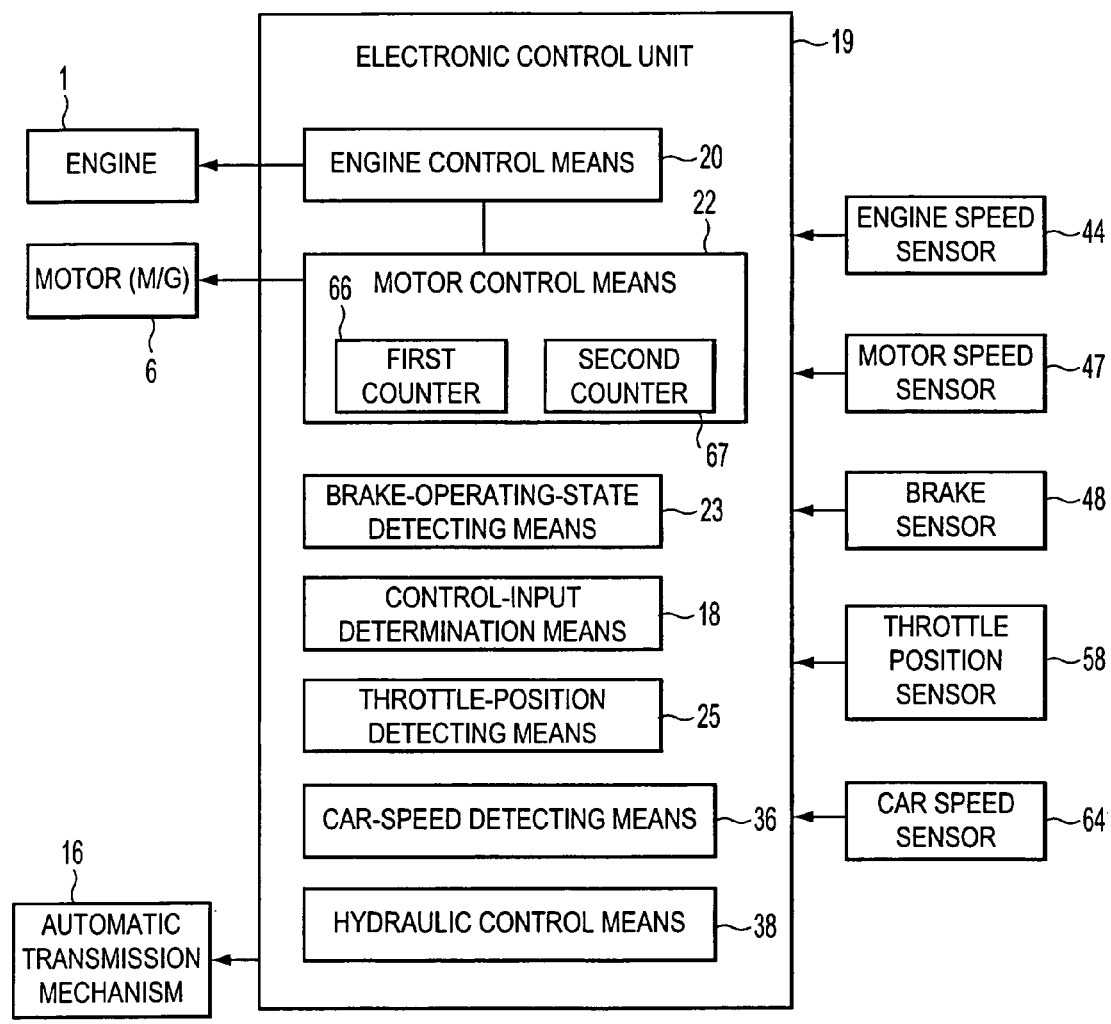
FIG. 8 is a block diagram of a control device for a hybrid-vehicle according to a second example.
Figure 9:
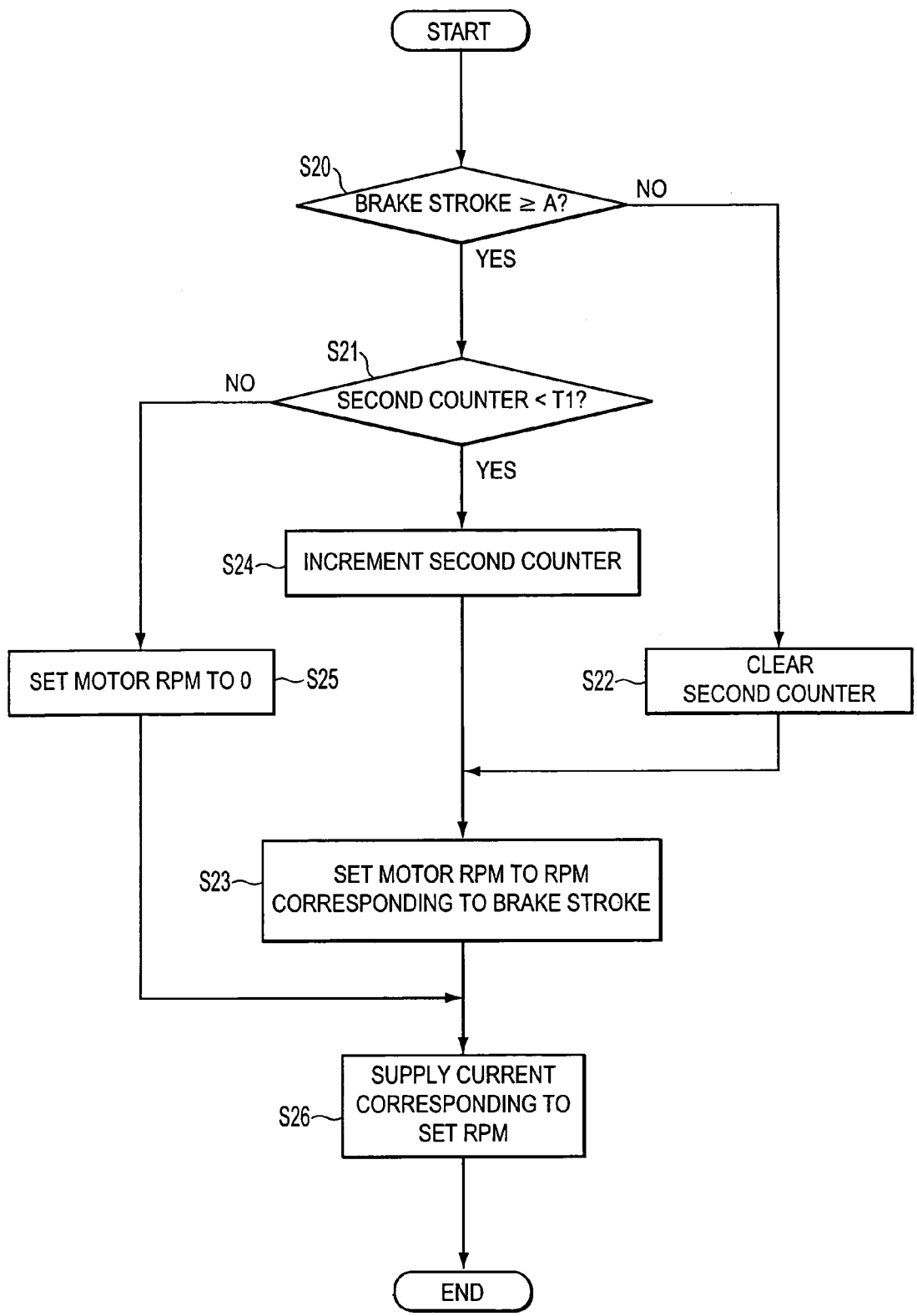
FIG. 9 is a flowchart of another subroutine for the motor drive control found as step S2 of FIG. 4.

Another exemplary embodiment will be described with reference to the drawings. FIG. 8 is a block diagram of a control device for a hybrid-vehicle according to this embodiment and FIG. 9 is a flowchart of a subroutine of the embodiment for the motor drive control in step S2 of FIG. 4. Although FIG. 8 of this embodiment is different from FIG. 1 in that the electronic control unit 19 includes a control-input determination means 18, other parts are substantially the same, and principal parts are given the same numerals and a description of the other components is omitted.

Referring to FIG. 8, the control-input determination means 18 determines the depression amount of the brake pedal (braking amount, brake stroke) in addition to the depression (ON) and the release (OFF) of the brake pedal from the detection of the brake sensor 48. The motor control means 22 inputs the determination of the brake stroke by the control-input determination means 18, compares the brake stroke with a predetermined stroke A, and performs the later-described controls on the basis of the comparison. The brake stroke is defined as a depression ratio, for example, when a state in which the brake pedal is depressed to the maximum (full brake) is assumed to be 100 percent and a state in which the brake pedal is released (brake OFF) is assumed to be zero percent; thus, a 50-percent brake stroke is the middle amount between the full brake and the brake OFF.

Specifically, according to the motor drive control of the embodiment, first, the motor control means 22 determines in step S20 of FIG. 9 whether the brake stroke has reached the predetermined stroke A or more. As a consequence, when it is less than the predetermined stroke A, in step S22, the motor control means 22 clears the count of the second counter 68 which has counted the depression time of the brake pedal. Furthermore, in step S23, the motor control means 22 sets the rotational speed of the motor 6 to a rotational speed (predetermined rotational speed) corresponding to the brake stroke. In other words, in this case, because the braking operation is performed so that the stroke does not exceed the predetermined stroke A, the rotational speed is set to maintain the idling rotational speed as if the braking operation was not performed. The motor control means 22 controls the motor 6 so that it is supplied with a current corresponding to the set rotational speed. The setting of the rotational speed (predetermined rotational speed) in step S23 can be given by, for example, the expression $$\text{idling rotational speed} - \{(\text{current stroke} - A) \times (\text{idling rotational speed} - N1)/(100 - A)\}.$$

On the other hand, when it is determined in step S20 that the brake stroke has reached the predetermined stroke A or more, the motor control means 22 determines in step S21 whether the count of the brake depression time by the second counter 68 is less than the predetermined time T1 (refer to FIGS. 6 and 7). As a consequence, when the brake depression time does not exceed the predetermined time T1 (Yes), the motor control means 22 increments the second counter 68 in step S24 and sets a motor rotational speed corresponding to the brake stroke in step S23. In other words, in this case, as the stroke is the predetermined stroke A or more, the motor rotational speed is set to be decreased to the predetermined rotational speed N1 (refer to FIGS. 6 and 7). The motor control means 22 controls the motor 6 so that it is supplied with a current corresponding to the set motor rotational speed.

When it is determined in step S21 that the count of the brake depression time has reached the predetermined time T1 or more (No), the motor control means 22 sets the motor rotational speed to 0 rotational speed in step S25 and controls the motor 6 to operate in correspondence with the setting (to stop the revolution) in step S26.

As set forth hereinabove, according to the exemplary embodiments, when the brake-operating-state detecting means 23 has sensed the braking condition while the motor 6 is being operated at an idling rotational speed (or more than the rotational speed) with the engine 1 unfired, the motor control means 22 controls the rotational speed of the motor 6 so as to reach the predetermined rotational speed N1 less than the idling rotational speed, so that the motor 6 can continue to rotate at the predetermined rotational speed N1 without stop when the brake is applied during creeping. This eliminates the shock at the time of switching from the static friction of the motor 6 to dynamic friction which tends to occur every time the brake is released or applied during creeping, thus improving drive feeling. Driving at an rotational speed lower than the idling rotational speed during braking reduces power consumption effectively. Furthermore, because the rotor 13 is directly connected to the crankshaft 3 of the engine 1, the crankshaft 3 can be stably rotated by the rotation of the motor to start the engine, thus reducing, as much as possible, the vibrations of the engine 1 and its mount which tend to occur at the start of the engine.

Figure 10:
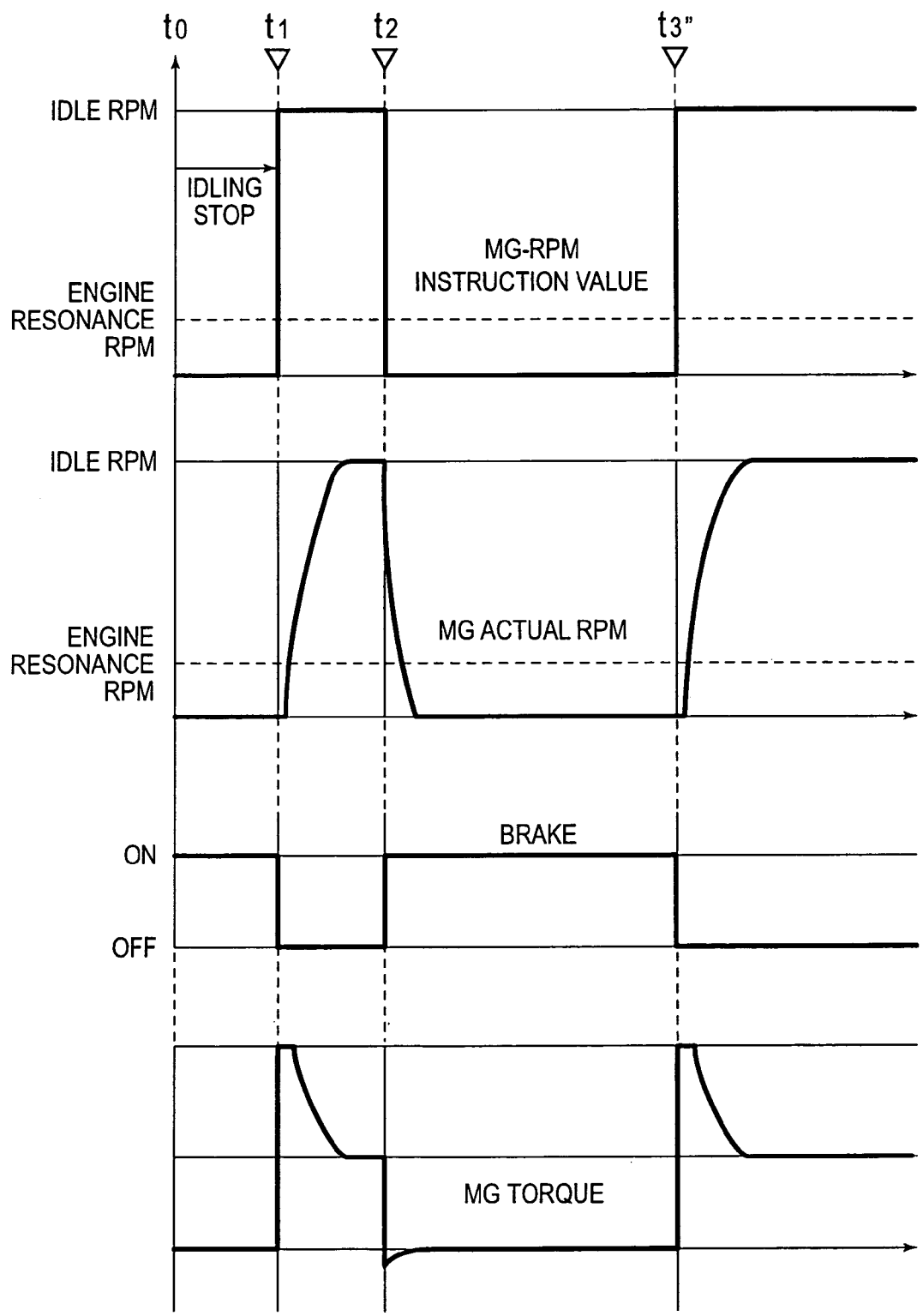
FIG. 10 is a timing chart for the operation timing of conventional braking operation and motor rotational speed.

Referring to FIG. 10, for example, with the conventional type in which the MG-rotational speed instruction value is set so as to stop the motor rotational speed every time the brake pedal is depressed, the rotational speed passes through the range of the engine resonance rotational speed every time the rotating motor 6 decreases in rotational speed toward a stop range and increases in rotational speed from the stop range to an idling rotational speed in response to the brake ON and OFF. Thus, uncomfortable shock due to the vibrations generated at the time of the passage is applied to a driver every time together with the above-mentioned shock due to the switching from the static friction to the dynamic friction. According to the exemplary embodiments, however, the predetermined rotational speed N1 for the brake pedal depression is set so as to exceed the engine resonance rotational speed. Accordingly, the motor rotational speed does not pass through the range of the engine resonance rotational speed every time the motor rotational speed decreases, so that the uncomfortable shock that tends to occur every time the brake is released or applied can be reduced as much as possible, thus improving drive feeling.

According to the first exemplary embodiment, the motor 6 rotating at the predetermined rotational speed N1 is stopped at the point in time when the braking has elapsed the predetermined time T1. Accordingly, it can be determined from the braking elapsed time that a driver desires to stop the car not intermittently but completely during creeping, and the motor 6 can be stopped from the determination. Thus, unnecessary rotation of the motor 6 can be saved and so power consumption can be saved.

According to the second exemplary embodiment, in a state in which the brake stroke (brake control input) determined by the control-input determination means 18 is less than a predetermined value when the braking state is sensed by the brake-operating-state detecting means 23, the motor control means 22 controls the motor not to switch to the predetermined rotational speed N1 to maintain the idling rotational speed. Accordingly, for example, when the brake stroke is less than 50 percent, the idling rotational speed can be maintained while regarding it as a state in which creeping by the motor 6 is desired; on the other hand, when the brake stroke exceeds 50 percent, the rotational speed can be switched to the predetermined rotational speed N1 while regarding it as a state in which temporary stop is desired. In this way, correct motor drive control can be performed while determining the driver's intension depending on the difference in brake stroke (brake depression amount). Furthermore, because the motor control means 22 sets the predetermined rotational speed N1 depending on the brake stroke determined by the control-input determination means 18, an optimum motor rotational speed corresponding to the brake stroke can be given.

As set forth hereinabove, the control device for a hybrid-vehicle is useful for vehicles such as passenger cars, trucks, and buses and, more particularly, for vehicles that require the prevention of uncomfortable shock at the time of braking during creeping produced only by motor driving.

The invention claimed is:

1. A control device, for a hybrid vehicle having a motor including a rotor and a stator capable of transmitting the driving forces of an engine and the motor to downstream power transmission components comprising:
   brake-operating-state detecting means for detecting the operating state of a brake for braking or releasing the driving wheel; and
   motor control means capable of controlling the rotational speed of the motor to a predetermined rotational speed less than an idling rotational speed when the brake-operating-state detecting means detects the braking state while the motor is being rotated at an idling rotational speed or more with the engine ignition off.

2. The control device for a hybrid vehicle according to claim 1, wherein
   the motor control means sets the predetermined rotational speed depending on the control input of the brake.

3. The control device for a hybrid vehicle according to claim 2, wherein
   the rotor is directly connected to an output shaft of the engine.

4. The control device for a hybrid vehicle according to claim 3, wherein
   the predetermined rotational speed exceeds an engine resonance rotational speed.

5. The control device for a hybrid vehicle according to claim 4, wherein
   the motor control means stops the motor rotating at the predetermined rotational speed at the point in time when a predetermined time has elapsed from the start of the braking.

6. The control device for a hybrid vehicle according to claim 5, comprising
   brake operating amount determination means for determining the brake operating amount of the brake,
   wherein when the braking state of the brake is detected by the brake-operating-state detecting means, when the brake operating amount determined by the brake operating amount determination means is less than a predetermined value, the motor control means does not perform switching to the predetermined rotational speed to maintain the idling rotational speed.

7. The control device for a hybrid vehicle according to claim 3, wherein the motor control means stops the motor rotating at the predetermined rotational speed at the point in time when a predetermined time has elapsed from the start of the braking.

8. The control device for a hybrid vehicle according to claim 2, wherein the predetermined rotational speed exceeds an engine resonance rotational speed.

9. The control device for a hybrid vehicle according to claim 8, wherein the motor control means stops the motor rotating at the predetermined rotational speed at the point in time when a predetermined time has elapsed from the start of the braking.

10. The control device for a hybrid vehicle according to claim 2, wherein the motor control means stops the motor rotating at the predetermined rotational speed at the point in time when a predetermined time has elapsed from the start of the braking.

11. The control device for a hybrid vehicle according to claim 1, wherein the rotor is directly connected to an output shaft of the engine.

12. The control device for a hybrid vehicle according to claim 11, wherein the predetermined rotational speed exceeds an engine resonance rotational speed.

13. The control device for a hybrid vehicle according to claim 12, wherein the motor control means stops the motor rotating at the predetermined rotational speed at the point in time when a predetermined time has elapsed from the start of the braking.

14. The control device for a hybrid vehicle according to claim 11, wherein the motor control means stops the motor rotating at the predetermined rotational speed at the point in time when a predetermined time has elapsed from the start of the braking.

15. The control device for a hybrid vehicle according to claim 1, wherein the predetermined rotational speed exceeds an engine resonance rotational speed.

16. The control device for a hybrid vehicle according to claim 15, wherein the motor control means stops the motor rotating at the predetermined rotational speed at the point in time when a predetermined time has elapsed from the start of the braking.

17. The control device for a hybrid vehicle according to claim 1, wherein the motor control means stops the motor rotating at the predetermined rotational speed at the point in time when a predetermined time has elapsed from the start of the braking.

18. The control device for a hybrid vehicle according to claim 1, comprising brake operating amount determination means for determining the brake operating amount of the brake, wherein when the braking state of the brake is detected by the brake-operating-state detecting means, when the brake operating amount determined by the brake operating amount determination means is less than a predetermined value, the motor control means does not perform switching to the predetermined rotational speed to maintain the idling rotational speed.

19. A control device, for a hybrid vehicle having a motor including a rotor and a starter capable of transmitting the driving forces of an engine and the motor to the downstream of power transmission and rotating the rotor with a driving wheel in the downstream of power transmission braked, comprising:
 a brake-operating-state detector that detects the operating state of a brake for braking or releasing the driving wheel; and
 a motor controller capable of controlling the rotational speed of the motor to a predetermined rotational speed less than the idling rotational speed when the brake-operating-state detecting means detects the braking state while the motor is being rotated at an idling rotational speed or more with the engine ignition off.

20. A method for controlling a hybrid vehicle having a motor including a rotor and a starter capable of transmitting the driving forces of an engine and the motor to the downstream of power transmission and rotating the rotor with a driving wheel in the downstream of power transmission braked, comprising:
 detecting the operating state of a brake for braking or releasing the driving wheel; and
 controlling the rotational speed of the motor to a predetermined rotational speed less than the idling rotational speed when the brake-operating-state detecting means detects the braking state while the motor is being rotated at an idling rotational speed or more with the engine ignition off.

* * * * *